United States Patent [19]

Zawodny et al.

[11] 4,332,449

[45] Jun. 1, 1982

[54] FILM ADVANCE AND REWIND MECHANISM

[75] Inventors: Arthur Zawodny, Budd Lake; Jerzy Krysicki, Passaic, both of N.J.

[73] Assignee: Keystone Camera Corporation, Clifton, N.J.

[21] Appl. No.: 207,671

[22] Filed: Nov. 17, 1980

[51] Int. Cl.³ .................... G03B 1/00; G03B 17/26
[52] U.S. Cl. .................................. 354/214; 354/275
[58] Field of Search ..................... 354/275, 212–215, 354/217, 218, 173

[56] References Cited

U.S. PATENT DOCUMENTS

| 2,213,741 | 9/1940 | Mihalyi | 354/215 |
| 2,879,704 | 3/1959 | Winkler et al. | 354/213 |
| 3,613,541 | 10/1971 | Beach | 354/212 |
| 4,012,755 | 3/1977 | Arai | 354/173 X |

Primary Examiner—Donald A. Griffin
Attorney, Agent, or Firm—Neuman, Williams, Anderson & Olson

[57] ABSTRACT

A film advance and rewind mechanism is disclosed in which a thumbwheel is rotatable in only one direction and is drivingly coupled to a take-up spool only when rotated, the take-up spool being free to rotate in a rewind direction when a supply spool is rotated in a rewind direction.

7 Claims, 5 Drawing Figures

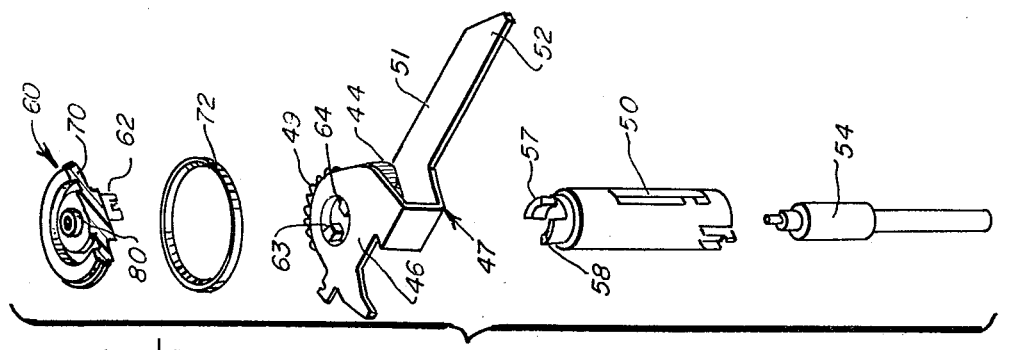
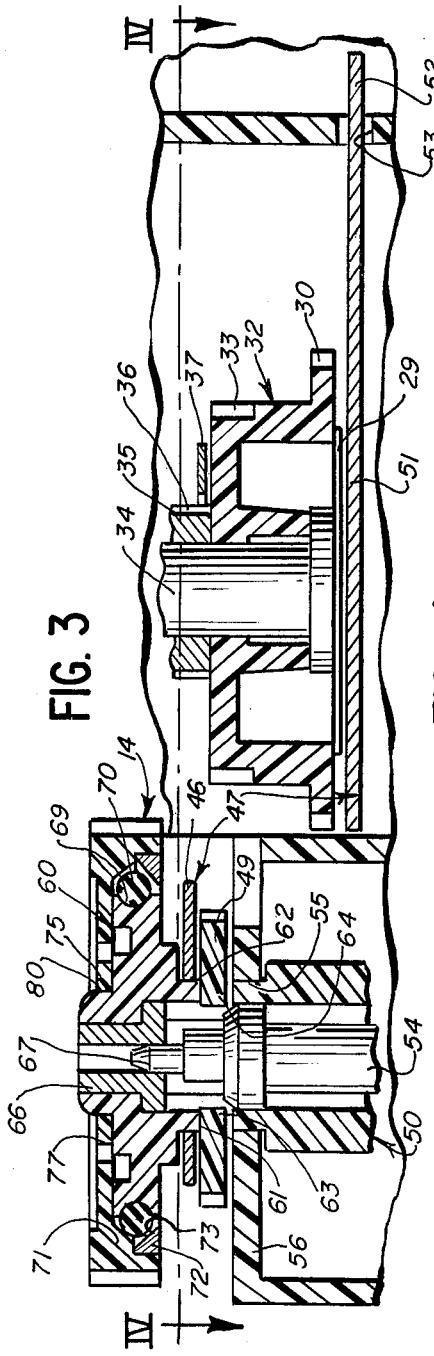
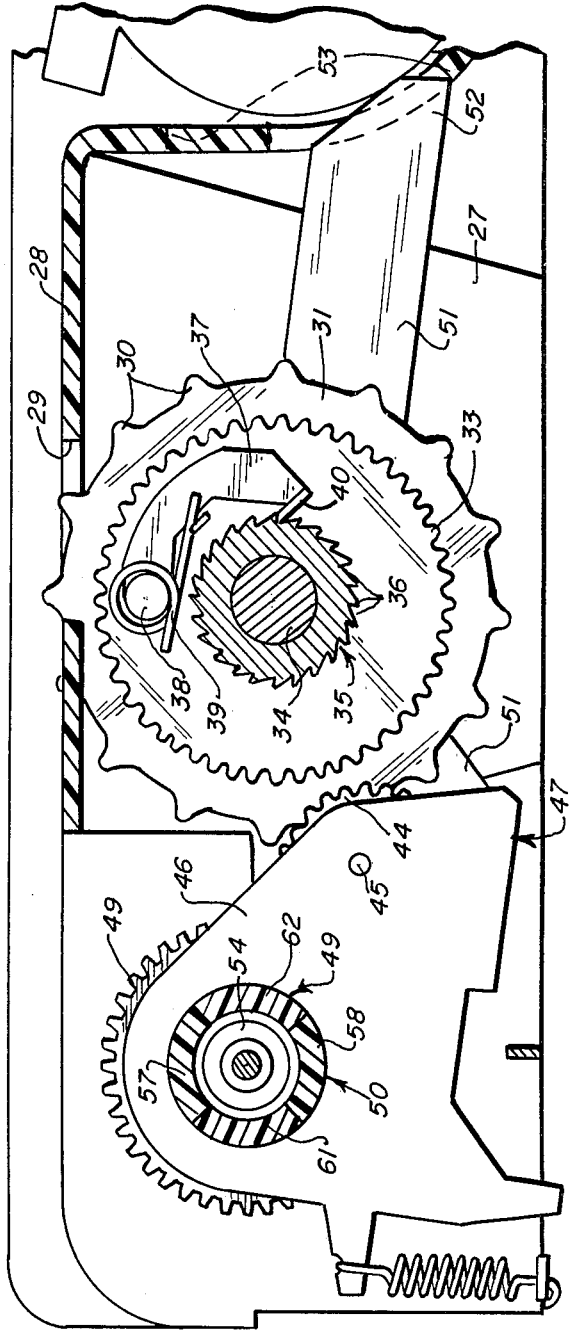

FILM ADVANCE AND REWIND MECHANISM

This invention relates to a film advance and rewind mechanism for a camera and more particularly to a mechanism which is easy to operate and which is highly reliable while being comparatively simple and readily and economically manufacturable.

BACKGROUND OF THE INVENTION

In cameras of the prior art, film advance and rewind means have been provided for rotating take-up and supply spools to advance and rewind the film. In some cases, a one-way clutch has been provided between the rewind lever or control and the supply spool for the purpose of reducing friction and drag during the film advance operation. For rewind, a release control button or the like has typically been provided for actuation by the user of the camera during operation of the rewind means, the control button being effective to disconnect the take-up spool from the film advance means. Another type of mechanism has also been proposed in which an operating knob is shifted axially between two positions, being operative in one position to rotate the take-up spool and being operative in the other position to rotate the supply spool and rewind the film.

Such prior types of mechanisms have been generally satisfactory but have been subject to malfunctions and have had other problems which have not been recognized by those responsible for the design of the cameras. For example, one problem which has not been recognized and dealt with is that the user of the camera may not realize that it is necessary to operate the release control button or to axially shift a control in order to rewind, especially when first operating the camera or when he operates the camera infrequently and forgets details of its operation from one time to another. If a user improperly operates the camera, he may, of course, damage its mechanism. For example, if he attempts to operate the rewind mechanism without operating the release button, he may damage the advance mechanism and other parts of the camera mechanism connected thereto.

Another aspect of the prior art mechanisms is that they are quite complicated and require a large number of parts, not only increasing the cost of manufacture of parts and assembly thereof but also increasing the possibility of problems due to improper assembly and due to wear or stressing of the parts.

SUMMARY OF THE INVENTION

This invention was evolved with the general object of overcoming disadvantages and problems with prior art cameras and of providing the film advance and rewind mechanism which is simple and trouble-free in operation.

Another object of the invention is to provide a camera having an advance and rewind mechanism which is readily and economically manufacturable while being highly reliable in operation.

In a camera constructed in accordance with this invention, film-advance means are provided including engagement means, preferably a thumbwheel, for operation in response to engagement thereof by a finger of a user and movement thereof in one direction and coupling means are provided between the engagement means and the take-up spool. The coupling means is normally in a first condition in which the take-up spool is decoupled from the engagement means to allow movement of the film in a rewind direction but the coupling means is operable to a second condition in response to operation of the engagement means to rotate the take-up spool and to move the film in the advancing direction. Preferably, movement of the engagement means is limited in a direction opposite the operating direction as by providing a ratchet pawl operatively engaged with a thumbwheel.

With this arrangement, it is not necessary to operate a release control button or to shift the position of an actuating knob to effect the rewind operation. The user may simply operate the rewind means which may include the typical rotatable handle which may be swung outwardly from the lower side of the camera.

The mechanism may preferably be combined with a safety mechanism which permits operation of the camera only when the film is properly loaded and, in accordance with a specific feature, the take-up spool means of the camera is coupled through a one-way clutch to shutter actuating means of the camera, the arrangement being such to allow free movement of the take-up spool in the rewind direction.

In accordance with another specific feature, the engagement means is in the form of a thumbwheel or the like and journalling means are provided for rotation thereof about an axis which is shifted transversely from a first position to a second position in response to engagement of a peripheral surface thereof by the finger of a user. The coupling means between the wheel and the take-up spool is disengaged in the first position of the axis and is engaged in the second position thereof. Thus, an arrangement is provided in which engagement of the thumbwheel automatically clutches the thumbwheel to the take-up spool for advancing the film while permitting free movement of the take-up spool in the rewind direction.

Additional specific features relate to details of the construction of the coupling means. In a preferred embodiment, the thumbwheel is formed with integral resilient fingers which engage a cylindrical surface concentric with the axis of the take-up spool, normally positioning the axis of the thumbwheel in alignment with the take-up spool axis. A ring of resilient material, preferably an O-ring, is provided for engagement in an annular groove to couple the thumbwheel to the take-up spool when the periphery of the thumbwheel is engaged. The arrangement is such that the components can be economically manufactured and readily assembled while at the same time being highly reliable and trouble-free in operation.

This invention contemplates other objects, features and advantages which will become more fully apparent from the following description taken in conjunction with the accompanying drawings.

BRIEF DESCRIPTION OF THE DRAWINGS

FIG. 3 is a sectional view taken substantially along line III—III of FIG. 2;

FIG. 4 is a sectional view which is similar to FIG. 2 but at a lower elevation indicated by line IV—IV of FIG. 3 also differing from FIG. 2 in illustrating the condition of components when a film cartridge is installed in the camera in contrast to a condition without a cartridge installed in the camera as shown in FIG. 2; and FIG. 5 is an exploded perspective view illustrating the manner in which certain components of the mechanism are formed and assembled.

DESCRIPTION OF A PREFERRED EMBODIMENT

Figures 1, 2:
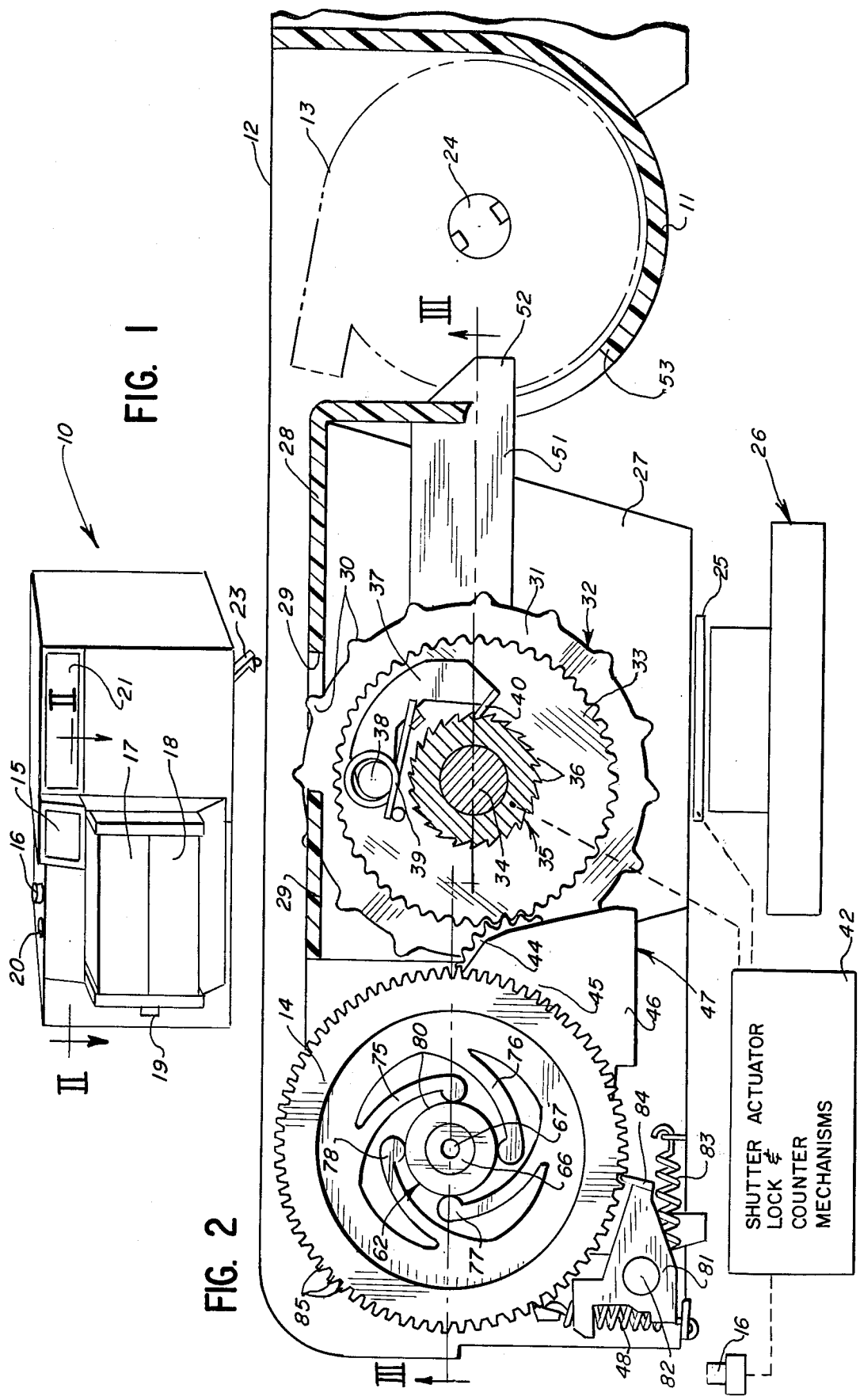
FIG. 1 is a perspective view of a camera which includes a film advance and rewind mechanism in accordance with the invention.
FIG. 2 is a top plan view of portions of the film advance and rewind mechanism with components connected thereto being shown diagrammatically, the level of view of FIG. 2 being indicated by line II—II in FIG. 1.

Reference numeral 10 generally designates a camera which includes a film advance and rewind mechanism constructed in accordance with the principles of this invention. The camera 10 as illustrated is of a type designed for use with a standard 35 MM cartridge, it being understood that the mechanism of the invention may be used with cameras of other types.

In the operation of the camera 10, a hinged back (not shown) is opened and a film cartridge is inserted into a chamber which is defined by a wall portion 11 of a housing structure 12 (FIG. 2), a cartridge being shown in broken lines and being indicated by reference numeral 13. The end of the film is then drawn from the cartridge and is engaged with a take-up spool which is connected to and positioned on the axis of a thumbwheel 14. After closing the back, a rearward peripheral portion of the thumbwheel 14 may be engaged by the thumb of the user to advance the film and to cock a shutter of the camera, as hereinafter described. Pictures are taken by viewing through a viewfinder 15 and depressing a shutter release button 16.

As illustrated, although not part of the invention, a pair of hinged front doors 17 and 18 are provided which are held in a closed position by a latch 19 and which are spring-loaded to be swung forwardly to open positions either upon manual actuation of latch 19 or in the initial portion of downward movement of the shutter release button 16. Also, a counter is provided for counting the number of pictures taken after loading of a cartridge in the camera, the number being shown on a dial visible through a window 20. In addition, a built-in flash is provided which includes a strobe lamp and a reflector behind a front window 21.

After taking a complete roll of pictures, the user may rewind the film into the cartridge 13 by pulling out a pivoted rewind handle 23 to a downwardly projecting position as illustrated in FIG. 1, the handle 23 being then rotated about a vertical axis to rewind the film. Handle 23 is coupled through conventional means, not shown, to a rewind shaft 24 at the lower end of the cartridge chamber (FIG. 2), shaft 24 being drivingly engaged with a lower end of a spool in the cartridge 13.

As diagrammatically illustrated in FIG. 2, a shutter 25 is disposed between a lens unit 26 and the forward end of a portion 27 of the housing 12 which defines an exposure chamber. The film extends from the cartridge 13 through an image area at the rear of the exposure chamber 27, an upper edge portion of the film being engaged with the rearward face of a wall portion 28 which has an opening 29 through which sprocket teeth 30 extend to engage in sprocket holes of the film.

The illustrated arrangement includes a safety mechanism which permits operation of the camera only when film is properly loaded into the camera and which is optionally but desirably combined with the advance and rewind mechanism of the invention. As illustrated, the sprocket teeth 30 are formed on a lower sprocket portion 31 of a metering wheel 32 which includes an upper gear portion 33 and which is journalled on a shaft 34, shaft 34 being supported at its upper end from a fixed plate of the camera, not shown. A metering cam element 35 is also supported on the shaft 34 above the metering wheel 32 and it includes cam or actuating structure on an upper portion thereof, not shown, and also includes a lower portion, as shown, having ratchet teeth 36 arranged to be engaged to be rotated in one direction from the metering wheel 32, through an interlock lever 37. Lever 37 is journalled on an upwardly projecting stud portion 38 of the wheel 32 and is urged by a spring 39 in a clockwise direction to engage a pawl 40 at one end thereof with the ratchet teeth 36. With this arrangement, the metering cam element 35 is driven in a counter-clockwise direction, as viewed from above, when the metering wheel 32 is driven in the same direction.

As diagrammatically illustrated in FIG. 2, the shutter 25, the metering cam element 35 and also the shutter release button 16 are connected to shutter actuator, lock and counter mechanisms 42 which are of conventional construction, the details thereof being not illustrated. Upon counter-clockwise rotation of the element 35 through a certain angular distance corresponding to one frame of the film (an angular distance of 180° in the illustrated embodiment), the shutter actuator is cocked and a lock is actuated to prevent further rotation of the element 35 in a counter-clockwise direction. Also, a counter dial is rotated through a certain angular distance to permit viewing of a next-higher number through the window 20. When the release button 16 is depressed, the shutter 25 is operated and the lock mechanism is released to again permit rotation of the cam element 35 in a counter-clockwise direction and re-cocking of the shutter actuator operation of the lock and advancing movement of the counter dial.

With the optionally provided safety mechanism of the illustrated embodiment, the metering wheel 32 is driven from rotation of the thumbwheel 14 in either of two ways, depending upon conditions of operation. When a film cartridge is installed in the camera and the film is properly threaded and connected to a take-up spool, the film is driven by rotation of the take-up spool and the wheel 32 is driven by the film, through engagement of the sprocket teeth 30 in sprocket holes of the film. When no cartridge is installed in the camera, under conditions as depicted in FIG. 2, the metering wheel 32 is driven from an idler gear 44 which has peripheral teeth meshed with the peripheral teeth of the gear portion 33 of the metering wheel 32, the idler gear 44 being driven from rotation of the thumbwheel 14. The arrangement is such that when a cartridge is installed, the film must be properly threaded and connected to the take-up spool in order to permit operation of the shutter 25. However, when no cartridge is installed, the shutter actuating mechanism may be cocked and the shutter may be operated for test purposes.

The idler gear 44 is journalled on a stud element 45 which has a reduced diameter end portion affixed in an opening in an upper portion 46 of a sensor arm 47 which is urged by a spring 48 (FIG. 4) to a position as illustrated in FIG. 2. The upper portion 46 of the sensor arm 47 is journalled for pivotal movement about the axis of the thumbwheel 14 and the idler gear 44 continuously meshes with a thumbwheel gear 49 (FIGS. 3 and 4)

connected to the take-up spool, indicated by reference numeral 50. The sensor arm 47 has a lower portion 51 which extends under the metering wheel 32, the portion 51 having a terminal end 52 extending through a slot 53 in the wall 11 and having a beveled edge engageable by a film cartridge 13 when installed in the chamber defined by the wall 11. As shown in FIG. 4, when a cartridge 13 is installed in the cartridge chamber, it engages the end portion 52 and the sensor arm 47 is rotated in a clockwise direction, as viewed from above, to move the idler gear 44 to a position in which the teeth thereof no longer mesh with the teeth of the gear portion 33 of the metering wheel 32. In this condition, the metering wheel 32 can be rotated only when sprocket teeth 30 are engaged in the sprocket holes of the film and the film is moved by counter-clockwise rotation of the take-up spool.

The take-up spool 50 is mounted on a take-up spool shaft 54 and the upper end of the spool 50 is journalled in an opening 55 in a wall portion 56 of the housing structure 12. The upper end of the spool 50 is formed with two upwardly projecting and diametrically opposed portions 57 and 58 which extend through the thumbwheel gear 49 and through an opening 59 in the upper portion 46 of the sensor arm 47 and into a socket in the lower side of a film-advance pulley 60. Pulley 60 is formed with two downwardly projecting and diametrically opposed portions 61 and 62 which engage between portions 57 and 58 of spool 50 and which are grooved at their lower ends to receive radially inwardly extending projections 63 and 64 of the thumbwheel gear 49. Thus, the thumbwheel gear 49, take-up spool 50 and film-advance pulley 60 are drivingly coupled together. Pulley 60 is journalled on a bearing 66 which is seated on a reduced-diameter end portion 67 of the take-up spool shaft 54.

The thumbwheel 14 could be directly coupled to the take-up spool, if desired, and such would not affect the operation of the safety mechanism as described. However, in accordance with this invention, an arrangement is illustrated in which the pulley 60 is releasably coupled to the thumbwheel 14. The arrangement permits a free rewind operation with no release mechanism being required to effect a rewind operation.

In particular, the pulley 60 has an annular peripheral groove 69 which receives an O-ring 70 of resilient elastomeric material. The thumbwheel 14 has an inwardly facing beveled surface 71 and a ring 72 is secured in a groove in the lower face of the thumbwheel 14, the ring 72 having an inwardly facing beveled surface 73. The surfaces 71 and 73 form an inwardly facing generally V-shaped groove on the outside of the O-ring 70.

The thumbwheel 14 is also formed with four fingers 75, 76, 77 and 78 which extend angularly and radially inwardly to terminal ends which are engageable with an external cylindrical surface portion 80 at the upper end of the pulley 60. Normally, the fingers 75–78 hold the thumbwheel 14 in a centered position such that the surfaces 71 and 73 do not engage the O-ring 70. However, when a slight radial pressure is applied at the periphery of the thumbwheel 14, the surfaces 71 and 73 frictionally engage the O-ring 70 and when the thumbwheel 14 is rotated, the pulley 60 is then rotated therewith.

To prevent rotation of the thumbwheel 14 in a clockwise direction, an interlock lever 81 is provided which is journalled on a stud 82 and which is biased by a spring 83 in a clockwise direction to engage a pawl portion 84 thereof with peripheral teeth 85 of the thumbwheel 14.

With this arrangement, the thumbwheel 14 may be rotated in a counter-clockwise direction to rotate the gear 49 and the take-up spool 50, acting through the pulley 60. If a cartridge is not installed in the camera, the metering wheel 32 is rotated in a counter-clockwise direction through engagement of the idler gear 44 with the metering wheel gear portion 33. If a cartridge 13 is installed in the camera and if the film is properly threaded and connected to the take-up spool 50, the sprocket portion 31 of the metering wheel 32 is driven from the film.

After a complete roll of pictures has been taken, the rewind handle 22 is moved to a downwardly projecting position as illustrated in FIG. 1 and it is rotated to rotate the rewind shaft 23 and to thereby rotate the spool of the cartridge 13 to rewind the film. In this operation, the pulley 60 together with the gear 49 and the take-up spool 50, may rotate freely, there being no engagement between the O-ring 70 and the surfaces 71 and 72 since the thumbwheel 14 is held by the fingers 75–78 in a centered position. The metering wheel 32 may rotate in a clockwise direction during the rewind operation, with the pawl portion 40 of the lever 37 riding freely over the teeth 36 of the cam element 35. Thus the cam element 35 is not rotated in a clockwise direction.

There is thus provided a film advance and rewind mechanism in which the film may be easily rewound with minimal effort by simply rotating the supply spool in a rewind direction, no release of the take-up spool or any other operation being required. The mechanism is simple, uses few component parts and is otherwise economically manufacturable while being reliable and trouble-free in operation.

It will be understood that modifications and variations may be effected without departing from the spirit and scope of the novel concepts of this invention.

I claim:

1. In a camera including means for journalling supply and take-up spool means, film advance means for driving said take-up spool means to move film in an advancing direction from said supply spool means to said take-up spool means, and film rewind means for driving said supply spool means to move film back in a rewind direction from said take-up spool means to said supply spool means, said film-advance means comprising: engagement means for operation in response to engagement thereof by a finger of a user and movement thereof in one direction, and coupling means between said engagement means and said take-up spool means, said coupling means being normally in a first condition in which said take-up spool means is decoupled from said engagement means for allowing movement of the film in said rewind direction, and said coupling means being operable to a second condition in response to operation of said engagement means to rotate said take-up spool means and to move the film in said advancing direction, said engagement means comprising a wheel having a peripheral surface for engagement by a finger of the user, and journalling means supporting said wheel for rotation about an axis shifted transversely from a first position to a second position in response to engagement of said peripheral surface by the finger of a user.

2. In a camera as defined in claim 1, said coupling means being disengaged in said first position of said axis and being engaged in said second position of said axis.

3. In a camera as defined in claim 2, said journalling means including resilient means for urging said axis to said first position.

4. In a camera as defined in claim 3, said journalling means comprising a cylindrical surface having an axis aligned with said first position of said axis of said wheel, and said resilient means including a plurality of resilient fingers extending radially from said wheel and engaged with said cylindrical surface.

5. In a camera as defined in claim 1, said coupling means comprising a member coupled to said take-up spool means, first annular surface means on said member, and second annular surface means on said wheel engaged with said first annular surface means in said second position of said axis of said wheel.

6. In a camera as defined in claim 5, one of said annular surface means including a ring of resilient material, and the other of said annular surface means including an annular groove for receiving and engaging said ring in said second position of said axis of said wheel.

7. In a camera including means for journalling supply and take-up spool means, film advance means for driving said take-up spool means to move film in an advancing direction from said supply spool means to said take-up spool means, and film rewind means for driving said supply spool means to move film back in a rewind direction from said take-up spool means to said supply spool means, said film-advance means comprising: engagement means comprising a wheel having a peripheral surface for engagement by a finger of a user to effect rotation thereof in one direction, and coupling means between said engagement means and said take-up spool means, said coupling means being normally in a first condition in which said take-up spool means is decoupled from said engagement means for allowing movement of the film in said rewind direction, and said coupling means being operable to a second condition in response to operation of said engagement means to rotate said take-up spool means and to move the film in said advancing direction, means for limiting rotation of said engagement wheel in a direction opposite said one direction, shutter actuating means, and one-way clutch means coupling said take-up spool means to said shutter actuating means for operation of said shutter means in response to rotation of said take-up spool means in a film-advancing direction.

* * * * *